Patented Mar. 8, 1949

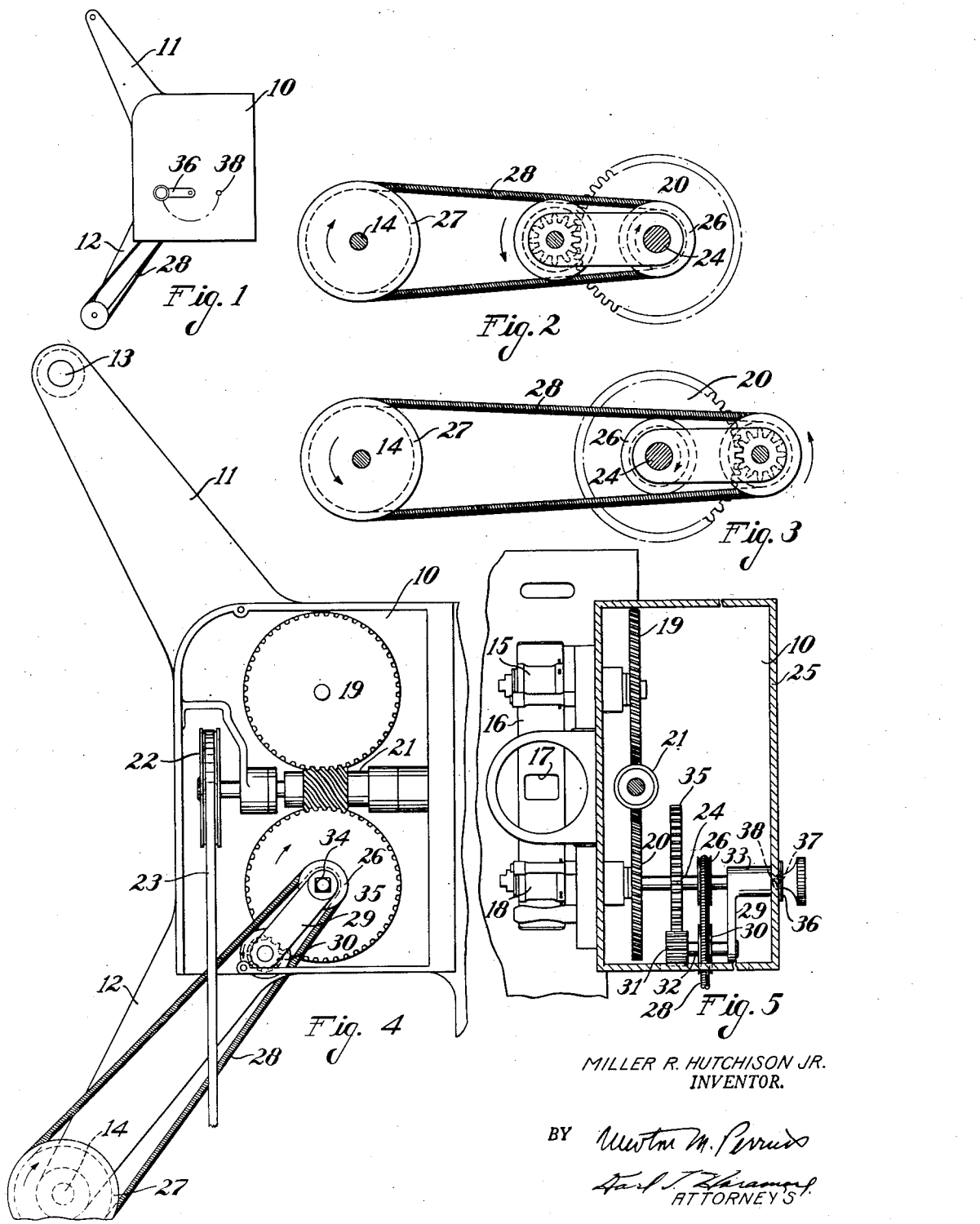

2,464,135

UNITED STATES PATENT OFFICE 2,464,135

MOTION-PICTURE PROJECTOR FILM TAKE-UP AND REWIND MECHANISM

Miller R. Hutchison, Jr., Rochester, N. Y., assignor to Eastman Kodak Company, Rochester, N. Y., a corporation of New Jersey Application February 5, 1947, Serial No. 726,664

10 Claims. (Cl. 242—55)

1

The present invention relates to motion picture projectors and particularly to an improved film take-up and rewind mechanism for use thereon.

The objects of the present invention are to provide a film take-up and rewind mechanism for a motion picture projector which is designed to drive the take-up reel at varying rates of speed, as the diameter of the reel increases, without jerking the film or burdening the driving mechanism; to permit shifting from a take-up to a rewind condition, and vice versa, readily and with little effort; to rewind the film readily, efficiently and quietly when required to do so; to provide a mechanism which is robust and compact in character; which requires no manual changing of driving belts when shifting between take-up and rewind operations; and which is inexpensive so far as the manufacture of necessary parts is concerned.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings, in which Fig. 1 is a partial side elevation of a motion picture projector on reduced scale showing the relative positions and path of movement of a shift lever forming a part of the present invention as it moves to shift the mechanism from a take-up condition to a rewind condition, and vice versa;

Fig. 2 is a schematic showing of the essential parts of the present invention and in a position they assume for take-up purposes;

Fig. 3 is a schematic showing similar to Fig. 2 but with the parts shown in the positions they assume for rewind purposes;

Fig. 4 is a partial side view of a particular type of projector mechanism with the housing cover removed and showing the present invention incorporated therein and the parts of the mechanism in a take-up position; and Fig. 5 is a partial front view of the projector shown in Fig. 4 with one wall of the mechanism housing removed to show the relative position of the parts of the driving mechanism.

Like reference characters refer to corresponding parts throughout the drawings.

The take-up and film rewind of the present invention is adaptable for use with a projector having varied types of film paths and film-feeding mechanisms, as will be apparent from the

2 following description thereof. For the purpose of disclosing the invention, however, I have chosen to show it in combination with a motion picture projector of the type shown in Figs. 4 and 5 which includes a mechanism housing 10 from the upper and lower front corners of which extend reel arms 11 and 12, respectively. Rotatably mounted on the end of reel arm 11 is a spindle 13 on which a supply reel of film (not shown) is adapted to be mounted. As is well known, this reel spindle 13 may have any suitable form of hold-back mechanism associated therewith to keep the film from running off the reel freely as it is pulled forward by the film-advancing sprockets. Rotatably mounted in the end of the lower reel arm 12 is a spindle 14 on which a reel (not shown) is adapted to be mounted for take-up purposes.

As is well known, film from the supply reel is threaded over a constantly-driven sprocket 15 through a film gate 16 past a projection-aperture 17, thence over another constantly-driven film sprocket 18 and to the take-up reel on the spindle 14. The upper film sprocket 15 serves to draw the film from the supply reel and feed it into a loop in advance of the film gate and from which loop the film is pulled and fed past the projection aperture by an intermittent feeding mechanism of any suitable type (not shown). The lower sprocket 18 pulls the film from a loop following the film gate and feeds it to the take-up reel on the spindle 14. In the projector shown, the two film sprockets 15 and 18 are constantly driven by worm wheels 19 and 20, respectively, which each engage a worm 21 which is in turn driven through a pulley 22 by a belt 23 connected to a motor-driven pulley, not shown. The mechanism described up to this point is well known and constitutes no part of the present invention except insofar as it acts in combination with the take-up and rewind mechanism now to be described and constituting the present invention.

Coming now to the present invention, the sprocket shaft 24, on which the worm wheel 20 is fixed, is extended across the housing 10 and journaled in the wall 25 thereof. (See Fig. 5.) Also fixed to the shaft 24 is a driving pulley 26 which is adapted to be connected to a driven pulley 27 fixed to the end of the take-up spindle 14 by a spring belt 28, as shown in Figs. 2 and 4, when the drive is positioned for taking up film during projection operation of the projector. It is particularly noted that the diameter of the driven pulley 27 on the take-up spindle is somewhat larger than the driving pulley 26 so that the reach of the belt diverges slightly adjacent the driving pulley for reasons which will be clearly pointed out hereinafter. With the drive connected, as shown in Figs. 2 and 4, and with the shaft 24 rotated in the direction indicated by the arrow, it will be seen that the take-up spindle rotates clockwise at a relatively low speed, just sufficient to keep ahead of the film feed of the sprockets. The belt being slack slips at a predetermined safe torque to readily accommodate the changing diameter of the take-up reel on spindle 14.

For rewind purposes, the mechanism includes an intermediate assembly comprising a driving pulley 30 and a pinion 31 which are fixed in spaced relation on a stub shaft 32. The stub shaft 32 is rotatably mounted on the end of an arm 29 which is journaled at its other end on the sprocket shaft 24 by a sleeve 33 fixed thereto rotatably engaging the shaft and terminating in a square end 34 extending through the wall 25 of the housing. The driving pulley 30 is located within the reach of the belt 28 and lies in the plane thereof. (See Fig. 5.) When the drive is shifted to the take-up position, as shown in Figs. 2 and 4, the center of the driving pulley 30 lies on the center line of the driving pulley 26 and the driven pulley 27 and between the two. Inasmuch as the diameter of the driving pulley 30 is substantially the same as that of the driving pulley 26, or slightly smaller, because of the divergence of the reach of the belt adjacent pulley 27, the driving pulley 30 will slip relative to the belt and have no driving effect thereon.

The pinion 31 is normally in engagement with a spur gear 35 fixed to the sprocket shaft 24 and spaced along the shaft from the worm wheel 20 to permit the pinion to be rolled around the gear to a position 180° from that shown in Figs. 2 and 4 to the position shown in Fig. 3 for rewind purposes. For swinging the arm 29 from the take-up position of Figs. 2 and 4 to the rewind position of Fig. 3 and vice versa, a handle 36 is slipped onto the square end 34 of the sleeve 33. This handle extends parallel to the outside of the wall 25 of the housing and includes a spring-pressed ball 37 in one end thereof which is adapted to snap into one of two detents 38 in the wall 25 to frictionally and releasably retain the arm and the intermediate assembly associated therewith in either of its two positions. However, any suitable form of releasable locking means between the handle 36 and the wall 25 could be substituted for this purpose.

As will be observed from an inspection of Fig. 3, as the arm 29 is swung through 180° from the position shown in Figs. 2 and 4, to its rewind position, the driving pulley 30 swings around the driving pulley 26, stretching the belt 28 in so moving, and ends up with the belt 28 stretched tightly thereover and in driving engagement therewith. In this position the driving pulley 26 lies on the center line of the pulleys 27 and 30 and between the two and in which position, because of the divergence of the reach of the belt, it has no driving relation whatsoever with respect to the belt.

As the arm 29 moves between its two positions, the pinion 31 rolls around the gear 35 so that when the arm reaches the rewind position, the pinion is ready to drive the spindle 14 in a direction which is the reverse of that effected by the driving pulley 26 and at a higher speed than the drive effected by pulley 26. An empty reel will have been positioned on the take-up spindle 14 while the full reel will have been placed on the spindle 13 with a leader strip extending directly from one reel to the other for rewinding purposes. The spring belt tension is increased by the new position of the driving pulley 30 and thus its driving power is increased as required to prevent slippage. Now the driving pulley 26 takes no part in driving the film reel on spindle 14 since it is out of contact with the spring belt carried by the driving pulley 30. Instead, the drive is through the speed increasing reversing gearing between the sprocket shaft, gear 35, the driving pulley 30, and the tautened spring belt 28 to the reel spindle 14. During rewinding of the film it is preferred to quadruple its speed in the reverse direction to that during take-up in order to get the business over with as promptly as possible. By selecting a 4:1 gearing and increasing the tension on the spring belt 28 to reduce slippage, this is easily done. Other gear ratios may serve between the sprocket shaft 24 and the drive pulley 30 to better advantage when other than 400-foot reels and 8-toothed sprockets are employed.

While I have shown a separate spur gear 35 on the sprocket shaft 24 with which the pinion 31 is in engagement, rather than having the pinion engage the sprocket gear 20 directly, this is because of the particular arrangement of the reel arms and film-feeding mechanism used on this type of projector. Since the driving pulley 30 must assume two positions 180° apart, on the line of centers of the driving pulley 26 and the driven pulley 27, the rewind position of the pulley 30, if it directly engaged gear 20, would interfere with the supporting shaft of worm 21. On the other hand, if the reel arm 12 extended forwardly at right angles to the housing 10, or parallel to the projection axis, then the take-up reel might interfere with the projection beam. Therefore, it will be understood by those skilled in the art that if this take-up and rewinding mechanism were used with a projector having a different type of sprocket driving mechanism and/or reel arm arrangement, the pinion 31 might directly engage the sprocket driving gear, thus eliminating the separate gear 35 herein shown, or permit the arm 29 to move between two horizontal positions in either the take-up or rewind positions.

While I have shown a gear and pinion drive for the driving pulley 30, which is never broken, it will be obvious, in view of the present disclosure, that certain modifications could be made therein without going beyond the scope of the present invention. For instance, the gear 35 might be replaced by a wheel having a friction surface, e. g., a rubber-tire, around its periphery and the pinion 31 would then be a wheel having a friction surface around its periphery in engagement therewith. Furthermore, the gear 35, or its equivalent, might be moved to a position in the housing in which it would be engaged by the pinion or its equivalent only at such time as the intermediate assembly is moved to its rewind position.

While the handle 36 could be connected to the sleeve 33 so that it will align with the arm 29 of the intermediate assembly, and indicate the exact position of the arm, for purposes of symmetry I have chosen to show the handle 36 moved between two horizontally-spaced detents 38 on the wall of the housing 10 in shifting the drive from a take-up condition to a rewind condition and vice versa. (See Fig. 1.) This is readily accomplished by placing the handle 36 on the square end 34 of the sleeve 33 in a horizontal position when the intermediate assembly is in one of its two positions. The two positions of the handle 36 will be marked on the wall of the housing such as by R meaning rewind position and T meaning take-up position, so that the operator can readily tell in what condition the drive for the spindle 14 is in by merely looking at the position of the handle 36. It will be obvious that handle 36 could be replaced by any suitable type of control member. For example, it could be replaced by a key which could be removably placed on the square end 34 of the sleeve 33, or which could be pinned to the sleeve.

While I have shown and described certain specific embodiments of my invention, I am aware that many modifications thereof are possible. My invention therefore is not to be limited to the specific details of construction shown and described but is intended to cover all modifications coming within the scope of the appended claims.

Having thus described my invention, what I claim is new and desire to secure by Letters Patent of the United States is:

1. A film take-up and rewind mechanism for a motion picture projector comprising in combination a rotatable spindle adapted to support a reel onto which a film strip is to be wound; means for selectively driving said spindle in opposite directions and at different speeds, and comprising a driven pulley fixed to said spindle; a driving pulley smaller in diameter than said driven pulley and spaced therefrom; a resilient driving belt connecting said pulleys; means for driving said driving pulley in a given direction and at a speed commensurate with the take-up function of the reel when the projector is used for projection purposes; a second driving pulley of substantially the same diameter as the first driving pulley and located within the reach of said driving belt and spaced radially of said first driving pulley; means for mounting said second driving pulley for movement in the plane of said belt between an inoperative position, wherein its center lies on the center line of said driven pulley and first driving pulley and between the two wherein it has no driving effect on said belt, and an operative position, 180° from its inoperative position around the center of said first driven pulley, wherein it assumes driving control of said belt from said first driving pulley; and means for driving said second driving pulley in a direction opposite to said first driving pulley and at a higher speed than said first pulley when said second driving pulley is moved to its operative position for rewinding purposes, said last-mentioned means automatically rendered effective when said second driving pulley is moved to its operative position.

2. A film take-up and rewind mechanism for a motion picture projector comprising in combination a rotatable spindle adapted to support a reel onto which a film strip is to be wound; a driven pulley connected to said spindle to drive the same; a first driving pulley smaller in diameter than said driven pulley and spaced therefrom; means including a driving member of circular form connected to said driving pulley for driving the same in a given direction and at a constant speed commensurate with the take-up function of the reel when the projector is used for projection purposes; a resilient belt connecting said driven pulley to said first driving pulley; a second driving pulley located within the reach, and in the plane of, said belt and of substantially the same diameter as said first driving pulley; means for mounting said second driving pulley so that it can move in the plane of said belt between an inoperative position, wherein it lies on the center line of said driven pulley and first driving pulley and between the two so that it has no driving effect on the belt, and an operative, or rewinding, position, wherein its center is in alignment with the centers of the other two pulleys but lies on the opposite side of the first driving pulley from said driven pulley as when in said inoperative position and in which position it assumes driving control of said belt from said first driving pulley; means for driving said second driving pulley in an opposite direction and at a higher rate of speed with respect to said first driving pulley when it is in its operative position; and a manually controlled member for swinging said second driving pulley between its operative and inoperative positions.

3. A film take-up and rewind mechanism according to claim 2 including releasable means for maintaining said last-mentioned manually-controlled member in either one of said two positions.

4. A film take-up and rewind mechanism according to claim 2 including an arm on one end of which said second driving pulley is rotatably mounted, and the other end of which is pivoted at the center of said first driving pulley, and in which said manually-controlled member is connected to said arm to swing the same through 180 degrees to move said second driving pulley between its two positions.

5. A film take-up and rewind mechanism according to claim 2 in which the driving means for said second driving pulley comprises a circular driven member connected thereto and in constant driving engagement with the periphery of said circular driving member connected to said first driving pulley, said circular driven member adapted to roll around the periphery of said circular driving member as the second driving pulley is moved between its two positions.

6. A film take-up and rewind mechanism for a motion picture projector comprising in combination a rotatable spindle adapted to support a reel onto which a film strip is to be wound; a driven pulley connected to said spindle to drive the same; a drive shaft spaced from said spindle and substantially parallel thereto; means for driving said shaft at a constant rate; a driving member of circular form fixed to said shaft; a resilient driving belt connecting said driven and first driving pulleys for driving said spindle at a speed commensurate with operation of the projector at projection speed; an arm having one end pivotally mounted on said shaft; a second driving pulley rotatably mounted on the other end of said arm and located within the reach of said driving belt and in the plane thereof, the diameter of said second driving pulley being substantially the same as that of the first driving pulley so that when it lies on the center line of said driven pulley and first driving pulley and between the two, it will give up driving control of the belt to said first driving pulley; a driven member of circular form mounted on the end of said arm and connected to said second driving pulley and in driving and rolling contact with said circular driving member; and manually controlled means for swinging said arm from a take-up driving position, wherein the second driving pulley thereon lies on the center line of said driven pulley and first driving pulley and between the two, through 180 degrees to a rewind driving position, wherein the second driving pulley lies on the opposite side of said first driving pulley and assumes driving control of the belt from said first driving pulley to drive the belt in a reverse direction and at a higher speed as compared with the first driving pulley.

7. A film take-up and rewind mechanism according to claim 6 in which said driving pulleys and driving and driven members are enclosed within a housing, a crank fixed to said shaft and terminating in a handle extending to the outside of said housing for manually shifting said arm between its two positions, and cooperating means between said handle and the wall of said housing for releasably holding said handle, and the drive, in each of its two positions.

8. A film take-up and rewind mechanism for a motion picture projector comprising in combination a rotatable spindle adapted to support a reel onto which a film strip is to be wound; means for selectively driving said spindle in one direction at one speed for take-up purposes and in the opposite direction and at a higher speed for rewind purposes, and comprising a driven pulley fixed to said spindle; a first driving pulley spaced from said driven pulley; a resilient belt connecting said two pulleys; a second driving pulley of substantially the same diameter as the first driving pulley located within the reach of said belt and in the plane thereof and spaced radially from said first driving pulley; means for swinging said second driving pulley in its plane around said first driving pulley from an inoperative position, wherein its center lies on the line of centers of said driven and first driving pulley and between the two, to an operative position, wherein it lies 180 degrees from its inoperative position and takes over control of said belt from said first driving pulley, and means for driving said second driving pulley which permits the pulley to be swung between its two positions without breaking the driving engagement thereto and which drives said second pulley in a direction opposite to, and at a higher speed than, the drive of said first driving pulley.

9. A film take-up and rewind mechanism according to claim 2, in which said member of circular form is a spur gear, and in which the driving means for said second driving pulley comprises a pinion connected thereto and in constant driving engagement with said spur gear, said pinion adapted to roll around the periphery of said spur gear as the second driving pulley is moved between its two positions.

10. A film take-up and rewind mechanism according to claim 2, in which said member of circular form is a wheel having a frictional driving surface around its periphery and in which the driving means for said second driving pulley comprises a second and smaller wheel having a frictional driving surface around its periphery and disposed in frictional driving contact with said first wheel, said smaller wheel adapted to roll around said first wheel as the second driving pulley is moved between its two positions.

MILLER R. HUTCHISON, Jr.

REFERENCES CITED

The following references are of record in the file of this patent:

UNITED STATES PATENTS

| Number | Name | Date |
|---|---|---|
| 2,267,478 | Stechbort | Dec. 23, 1941 |